United States Patent Office 3,105,280
Patented Oct. 1, 1963

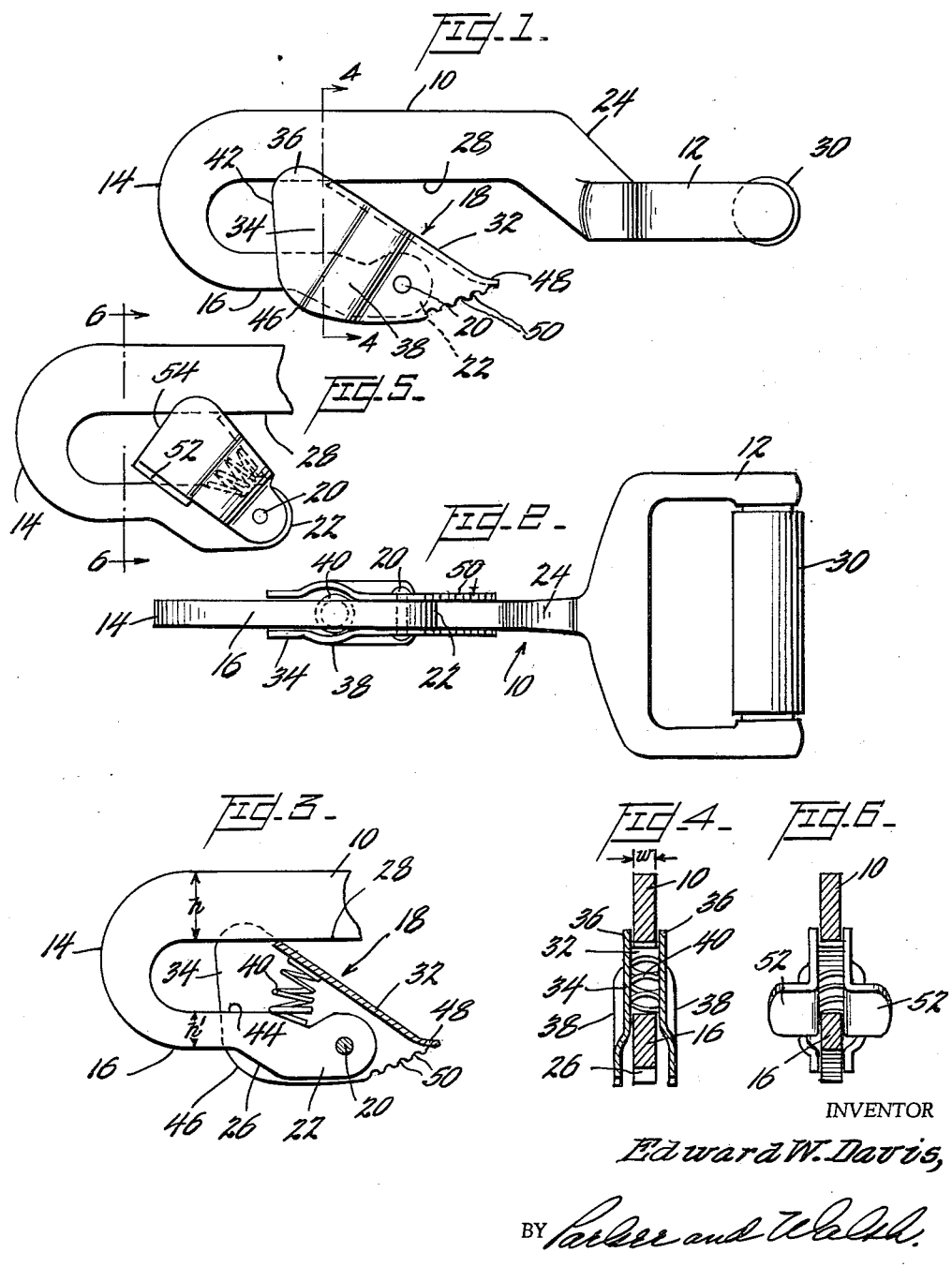

3,105,280
SNAP HOOK
Edward W. Davis, Fort Smith, Ark., assignor, by mesne assignments, to United States Forgecraft Corporation, Fort Smith, Ark., a corporation of Arkansas
Filed May 11, 1959, Ser. No. 812,349
1 Claim. (Cl. 24—234)

This invention relates to a snap hook especially adapted for use by linesmen and others working at elevated heights.

Snap hooks have long been a common article of harness hardware. When used with a companion ring, the resultant joint is easily made or broken, permits a large degree of freedom of movement of the two connected elements and satisfactorily transmits tension stresses from one element to the other. One present extensive field of application for such hooks is found on linesmens' safety belts. Hooks for such purposes are constructed with elaborate care, consistent with the recognized need for the utmost security to the linesman.

However, design within the industry has been substantially stable for many years. Although constructed of the best available materials and designed with extremely conservative factors of safety, the style of construction is relatively uniform and is essentially similar in operation to the snap hook of more than half a century ago. The hook is made up of a shank body having at its upper end a loop or eye for connection to a strap, belt or rope. At the opposite end of the body is the hook proper, terminating in a somewhat enlarged bill. Fixed to the head end of the body for pivotal movement toward and away from the hook bill is a tongue for closing the throat of the hook. A spring device is used to keep the tongue normally closed against the bill; when a ring is pressed against the tongue, it yields, permitting the ring to enter the throat and closing afterwards to prevent escape of the rings.

In use on linesman's belts, such hooks are subject to a hazard known as roll-out. When as a result of active movement of the linesman, the hook and its companion ring come to a reversely twisted position, one side of the ring may press against the tongue causing it to partially open. When the linesman next again changes his position, the ring will escape from the hook with serious and often fatal results.

The hook of the present invention departs materially from the common design of hook in several respects and additionally includes certain other features which contribute to the successful operation of the hook. The hook of this invention is especially characterized by location of the pivot point of the tongue upon the bill of the hook, the tongue being formed so that it cannot be displaced in a sidewise manner when in a closed position.

For a fuller explanation of the invention, reference is had to the accompanying drawing wherein:

FIGURE 1 shows a side view of a preferred embodiment of my invention;

FIGURE 2 shows a bottom view corresponding to FIGURE 1;

FIGURE 3 is a partial view corresponding to FIGURE 1, partially in section;

FIGURE 4 is a section taken on the line 4—4 of FIGURE 1;

FIGURE 5 is a partial view of another preferred embodiment of my invention; and

FIGURE 6 is a section taken along the line 6—6 of FIGURE 5.

As shown in the drawing, the hook is made up of a shank body 10 connected at its upper end to belt loop 12. The opposite end of the shank body continues in the hook portion 14 which, in turn is extended in a bill portion 16. The tongue 18 is pivoted on rivet 20 passing through the terminal hub 22 of the bill 16.

In order to more effectively keep the connection between the snap hook and its companion ring (not shown) free of contact with the linesman's belt or other articles worn or carried by the linesman, the form and shape of the entire snap hook have been altered from customary practice. The width $w$ of the shank body and bill are made relatively smaller than the height $h$ and $h'$ thereof. Additionally, a dog leg 24 is inserted between the shank body 10 and the belt loop 12 so that the inner face 28 of the throat between shank body 10 and bill 16 extends generally parallel to and outside of a line drawn between the radius of the roller 30 of the belt loop 12 and the center of the radius of hook 14. Similarly, a dog leg 26 is inserted between the main portion of bill 16 and the terminal hub 22, bringing the axis of rivet 20 in alignment with the outer face of bill 16.

For maximum safety, it is preferred to form the body 10, the belt loop 12, the hook 14 and the bill 16 from a unitary blank of alloy steel, by hot forging. With appropriate allowances for safety factors and the specific load to be applied, other materials and methods may be used.

It is preferred to make the tongue member 18 from a flat blank form in generally channel shape having a web member 32 and flanges 34. The main portion of the channel shell is of sufficient width to freely straddle the width of the shank body 10 and the bill 16. It will be noted that the inner end of the web 32 terminates short of the corresponding portion of the flanges 34 to provide rounded cheeks 36 which overlie a portion of the shank body 10. In this manner, when the tongue is closed, sidewise movement of the tongue is inhibited at both ends of a line drawn between the cheeks 36 and the axis of rivet 20.

To hold the tongue 18 in normally closed position, the channel shell is enlarged at 38 in order to provide an approximately cylindrical barrel to house spring 40, seated between the inner faces of dog leg 26 and web 32. The seat 41 on the face of dog leg 26 is generally parallel to the corresponding seat for the spring on the tongue body. The inner ends of flanges 34 are cut so that the angle made by the edge 42 of the flange end and the inner face 44 of bill 16 is generally within the range of 1 to 1.5 right angles. In this way, pressure exerted by the ring (not shown) against the face 44 and toward the terminal hub 22 of the bill, will serve to add to the force of the spring 40 to keep the tongue 18 closed. The skirt 46 of the flanges 34 is rounded to inhibit snagging of the linesman's clothing.

It will be obvious that a ring placed in the throat of the hook, may be drawn toward the bight thereof with the tongue yielding to catch and secure the ring. In order to release the ring, the outer portion of the channel shell is extended at 48 to form a finger lug. Since it is frequently the practice of linesmen to wear gloves on the job, it is desirable to provide serrations 50 upon the outer end of the channel webs, to more firmly engage the finger lug.

In the construction shown in FIGURES 5 and 6, the finger lug 48 is omitted from the channel shell and two lugs 52 are formed by turning up the skirts of the flanges 34. The pressure of a ring in the angle formed between the inner face 28 of the shank body 10 and the channel ends 54 will drive the inner end of the web member 32 more tightly against face 28 to hold the tongue in closed position. Should the ring bear outwardly along the flange ends 54 toward face 44 of bill 16, the slope of the flange ends and the extending lugs 52 will force the ring into the bight of the hook 14.

I claim:

A snap hook for service involving twisting about its longitudinal axis including; a flat-sided shank body portion; a strap-receiving loop at the upper end of said body portion; including a straight portion about which the strap is bent, extending substantially at right angles to the longitudinal axis of the snap hook; a reversely bent hook at the end opposite said loop, the bill of said hook terminating in a rounded, flat-sided hub, the shank body portion forming a dog leg at its upper end, with the loop, the major portion of the body lying upon one side of a line drawn through the center of the radius of the hook and the axis about which the attaching strap is bent, the throat face of said shank running generally parallel to said line; a channeled tongue pivoted on said hub, the web of said channel forming, with the shank body, an acute-angled throat for the hook, the main portion of the channel flanges forming a shell to overlie the side faces of the terminal hub in close parallelism to said faces to be guided thereby, the outward portion of said channel flanges forming cheeks to overlie the flat side faces of the shank body to limit the sidewise movement of the closed tongue, a pair of finger lugs on said tongue extending outwardly of said terminal hub; and a coil spring within the body of said tongue urging said tongue into closed position, one end of said spring being seated upon the channel of the tongue and the other end being seated on a flattened portion of the bill of the hook and said pair of finger lugs projecting outwardly in opposite directions from the flanges of the channel shell.

References Cited in the file of this patent

UNITED STATES PATENTS

| | | |
|---|---|---|
| 684,421 | Forstner | Oct. 15, 1901 |
| 1,837,094 | Arkema | Dec. 15, 1931 |
| 1,879,168 | Freysinger | Sept. 27, 1932 |
| 2,490,931 | Thompson | Dec. 13, 1949 |

FOREIGN PATENTS

| | | |
|---|---|---|
| 8,911 | France | Feb. 10, 1908 |

(Addition to No. 375,759)